United States Patent Office

3,561,959

Patented Feb. 9, 1971

3,561,959

SILVER COMPLEX DIFFUSION TRANSFER PROCESS

Jozef Frans Willems, Wilrijk, and Louis Maria de Haes, Edegem, Belgium, assignors to Gavaert-Agfa N.V., Mortsel, Belgium, a Belgian company No Drawing. Filed Dec. 11, 1967, Ser. No. 689,316
Claims priority, application Great Britain, Dec. 19, 1966, 56,649/66
Int. Cl. G03c *1/48, 5/54*
U.S. Cl. 96—29 7 Claims

ABSTRACT OF THE DISCLOSURE

A silver complex diffusion transfer process carried out in the presence of at least one compound corresponding to the following general formula or to a tautomeric structure thereof:

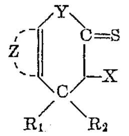

wherein

- Z represents the atoms necessary to close a fused-on phenyl nucleus including a substituted phenyl nucleus,
- each of $R_1$ and $R_2$ represents (the same or different) hydrogen, alkyl including substituted alkyl or aryl including substituted aryl, and
- X and Y both represent —H— or one of them represents —O— or —S— and the other one —NH— is described. Black or bluish-black transfer images are obtained more rapidly.

This invention relates to a photographic silver complex diffusion transfer process for producing diffusion transfer images possessing a black or bluish-black image tone and to a material to be used in such process.

The principle of the silver complex diffusion transfer process is described in our British patent specification 614,155, its first patent of addition 654,630, and in the German patent specification 887,733. According to this process, a light-sensitive silver halide material is image-wise exposed and then brought into contact with an image-receiving material in the presence of a developing substance, a complexing agent for silver halide and a processing liquid. The exposed parts of the silver halide emulsion layer are developed and do not undergo any further change. The unexposed silver halide is complexed by the complexing agent for silver halide, which is present either in the processing liquid or in the receiving material, and transferred by diffusion into the receiving layer, where it is converted into a silver containing image under the action of developing nuclei. In this way, a positive image of the original appears in the receiving layer after separation of the image-receiving material from the silver halide material.

In addition to the common development with an organic reduction agent in the presence of photochemical nuclei, finely divided metal particles such as colloidal silver or metal sulphide particles such as cobalt sulphide particles can initiate or catalyse the conversion of the transferred silver complex to a silver containing image in the receiving layer. A disadvantage of the silver complex diffusion transfer process, especially when metal sulphide nuclei are used, is the less agreeable brown image tone of the obtained silver containing diffusion transfer image.

Generally, this disadvantage is counteracted by the addition of a black-toning agent. Usually, this is an organic heterocyclic compound containing thioxo groups or their tautomeric mercapto groups. A widely used black-toning agent is 1-phenyl-2-tetrazoline-5-thione, which improves the image tone indeed, but at the same time strongly delays the formation of the diffusion transfer image in the image-receiving material, so that a longer contact time is required in order to obtain sufficiently dense prints. The used amount of this compound has to be kept within specific and rather narrow limits, since too high a concentration of black-toning agent even completely prevents development.

It has now been found that black or bluish-black transfer images are obtained in an accelerated way by carrying out the silver complex diffusion transfer process in the presence of at least one compound corresponding to the following general formula or to a tautomeric structure thereof:

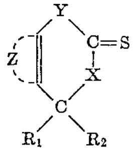

wherein:

- Z represents the atoms necessary to close a fused-on phenyl nucleus including a substituted phenyl nucleus,
- each of $R_1$ and $R_2$ represents (the same or different) hydrogen, alkyl including substituted alkyl or aryl including substituted aryl, and
- X and Y both represent —NH— or one of them represents —O— or —S— and the other one —NH—.

The following is a non-restrictive list of black-toning agents, which have proved to be particularly suitable for use according to the present invention, and which correspond to the above general formula:

(1)

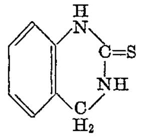

1,2,3,4-tetrohydroquinazoline-2-thione (2)

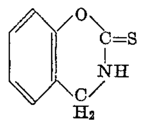

2H-3,4-dihydro-1,3-benzoxazine-2-thione (3)

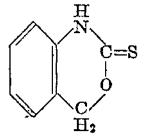

1H-2,4-dihydro-3,1-benzoxazine-2-thione (4)

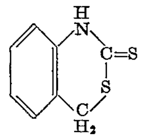

1H-2,4-dihydro-3,1-benzthiazine-2-thione (5)

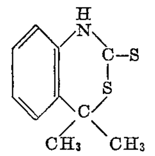

4,4-dimethyl-1,4-dihydro-2H-3,1-benzoxazine-2-thione

Compounds 1, 3, 4 and 5 are prepared as described in Fortschr. Chem. Forsch. 4 (1963) 561 and 579. Compound 2 is prepared as follows:

24.6 g. of o-hydroxy-benzylamine and 50 g. of carbon disulphide are boiled for 5 hours in 150 cc. of ethanol. The reaction mixture is filtered and the filtrate concentrated by evaporation. The precipitate is recrystallized from acetonitrile. Melting point: 204° C.

The black-toning agent according to this invention can be present in the processing bath and/or in the image-receiving material and/or in the light-sensitive material.

When present in the processing bath, it is perferably used in amounts mostly comprised between about 30 and 1000 mg. per liter of processing bath.

When the black-toning agent is present in the light-sensitive material, preferably from 5 to 20 mg. of black-toning agent are present per sq. m.

The black-toning agent can be present in any water-permeable layer, which is coated at the same side of the support as the light-sensitive silver halide emulsion layer and from which the black-toning agent can diffuse to the image-receiving layer of the image-receiving material e.g. in the light-sensitive silver halide emulsion layer itself or in a covering layer.

When incorporated into the image-receiving material, i.e. in the image-receiving layer and/or into a water-permeable layer from which it can diffuse in due time to the image-receiving layer (i.e. in a water permeable layer, which is in working contact with the image-receiving layer) it is perferably present in amounts ranging from about 10 to about 300 mg. of black-toning agent per sq. m. of image-receiving material.

The image-receiving material which can be used in a silver complex diffusion transfer process according to this invention, mostly consists of a support e.g. of paper which carries one or more layers, one of which is the image-receiving layer or nuclei-containing layer wherein the diffusion transfer image is formed in the presence of developing nuclei (physical and/or chemical) and/or of substances which are capable of forming developing nuclei with the diffusing complexed silver halide. The image-receiving material can also consist of a mere paper support incorporating constituents such as developing nuclei.

Also an image-receiving material can be used which is composed in such a way that several positive copies of an original can be produced from only one image-wise exposed light-sensitive material. Such an image-receiving material is among others described in our British patent specifications 950,960 and 961,177.

The image-receiving layer can also be applied to the same support as the silver halide emulsion layer. In that case, the image-receiving layer is mostly coated onto a support e.g. of paper and covered with a non-hardened or slightly hardened light-sensitive silver halide emulsion layer. Such a material is described among others in our British patent specification 654,631. After exposure, development and diffusion transfer of the unexposed complexed silver halide into the image-receiving layer, the exposed and developed unhardened emulsion layer or by removed e.g. by washing away with warm water or by stripping after having been in contact with a sheet of common paper. Between the image-receiving layer and the light-sensitive layer there can also be present a separating layer. In our British patent specification Ser. No. 1,006,292 is described a starch ether separating layer which enables the detaching of the light-sensitive layer as a coherent sheet, by simply bringing the multilayer material into an aqueous rinsing bath after the diffusion transfer image formation.

The light-sensitive material suitable for a diffusion transfer process wherein black-toning agents as described above can be used, may be any light-sensitive silver halide material the exposed silver halide of which is sufficiently rapidly developed and the non-exposed silver halide is sufficiently rapidly complexed for allowing the formation of a diffusion transfer image to take place. Preferably, silver chloride emulsions are used which may contain specific amounts of silver bromide or silver iodide or to which some ingredients may be added in order to obtain the desired emulsion characteristics.

The developing substance(s) can be incorporated into the light-sensitive material and/or into the bath and/or into the image-receiving material. Suitable developing substances are among others: hydroquinone, monomethyl-p-aminophenol sulphate, aminophenol and 3-pyrazolidinone developing substances. These developing substances can occasionally, at least partly be present in the materials used. Thus, hydroquinone together with a bisulphite can be present in the image-receiving material, such as described in our British patent specification Ser. No. 1,000,-115. Also combinations of two or more developing agents can be used successfully, such as the combination of hydroquinone and a 3-pyrazolidinone derivative together in the image-receiving material as described in our British patent specification 1,012,476, and the combination of hydroquinone in the image-receiving material and a 3-pyrazolidinone derivative in the light-sensitive material as described in the Belgian patent specifications 633,674 and 635,813.

The complexing agent forming a soluble complex with the silver halides is preferably an alkali thiosulphate and can be incorporated into the image-receiving material as well as into the processing bath.

Sulphides of heavy metals such as of antimony, bismuth, cadmium, cobalt, lead, nickel and silver; heavy metals such as silver, gold, platinum, palladium and mercury, preferably in their colloidal form, and/or other substances which can serve as developing nuclei for the complexed silver halide are mostly incorporated into the image-receiving layer. However, they can also be present in the processing bath. In the latter case, use is made of a light-sensitive and image-receiving material with a specific composition. Such diffusion transfer process with developing nuclei and/or compounds capable of forming such nuclei present in the processing bath has among others been described in our British patent specification Ser. No. 1,001,558 and in the Belgian patent specification 635,811.

In many cases it is favourable to counteract the fog formation in the exposed silver halide emulsion layers by using a fog-inhibiting agent. This fog-inhibiting agent e.g. can be present in the light-sensitive silver halide material and/or in the processing bath.

All the ingredients such as developing substances, complexing agents for silver halide, alkali, developing nuclei and the like which are necessary in a silver complex diffusion transfer process can be incorporated into the light-sensitive and/or image-receiving material used so that occasionally common water can be used as processing liquid. A suchlike process is described in the British patent specification 1,013,343.

Particulars concerning the exposing and developing apparatus that can be used as well as the silver complex diffusion transfer process in general and the materials suitable therefor, can be found in "Progress in Photography," vol. I, 1940–1950, pp. 76, 77 and 140; vol. II, 1951–1954, pp. 156–157; vol. III, 1955–1958, pp. 24–36 and in the patent literature cited therein.

A diffusion transfer process wherein use is made of black-toning agents as described in this invention, yields diffusion transfer images of a very satisfactory bluish-black to black colour.

The following examples illustrate the present invention.

EXAMPLE 1

An image-receiving material was prepared by coating a paper support of 90 g./sq. m. pro rata of 20 sq. m./litre with a layer from the following coating composition:

Water—201 cc.
Gelatin—10 g.
0.6% dispersion of nickel sulphide in a 2% aqueous gelatin solution—1.25 cc.
20% aqueous formaldehyde—2 cc.
Dextrin—5 g.
Pentaerythritol—7 g.
12.5% solution of saponin in a mixture of water and ethanol (80/20)—1 cc.

A light-sensitive material was prepared by coating a paper support of 90 g./sq. m. pro rata of 20 sq. m./litre with the following composition:

| | Cc. |
|---|---|
| Silver chloride emulsion | 100 |
| Water | 185.4 |
| 20% aqueous formaldehyde | 2 |
| 1% solution of 1,2,3,4-tetrahydroquinazoline-2-thione in isopropanol | 2 |

The light-sensitive material was then exposed while being in contact with an original to be reproduced, whereupon it was led, together with the image-receiving material, in the common way through a processing bath of the following composition:

Water—700 cc.
Anhydrous sodium sulphite—75 g.
Hydroquinone—16 g.
1-phenyl-3-pyrazolidinone—1 g.
Potassium bromide—1 g.
Sodium hydroxide—10 g.
Anhydrous sodium thiosulphate—10 g.
Water to make—1000 cc.

On leaving this processing solution, both materials were pressed together and then after a contact-time of about 20 seconds separated again. Contrary to the brown image-tone obtained when a light-sensitive material is used that does not contain the above mentioned black-toning agent, an image with completely neutral image-tone is obtained in the image-receiving material.

EXAMPLE 2

Example 1 was repeated with the difference, however, that the light-sensitive material did not contain a black-toning agent and that the processing bath contained per litre in addition to the ingredients mentioned in Example 1, 6.6 cc. of a 1% solution of 1,2,3,4-tetrahydroquinazoline-2-thione in isopropanol.

Here too, an image with neutral image-tone was obtained in the image-receiving material.

EXAMPLE 3

Example 1 was repeated with the difference, however, that the light-sensitive material did not contain a black-toning agent and that the coating composition of the image-receiving layer contained in addition to the ingredients mentioned in Example 1, 4.2 cc. of a 1% solution of 2H-3,4-dihydro-1,3-benzoxazine-2-thione in isopropanol.

In the image-receiving material an image is obtained with neutral image-tone.

We claim:

1. A photographic silver complex diffusion transfer process comprising developing an image-wise exposed light-sensitive silver halide emulsion layer and image-wise diffusion of non-developed and complexed silver halide from the said emulsion layer into an image-receiving layer of an image-receiving material where the complexed silver halide is converted into a silver-containing image in the presence of development nuclei and in the presence of at least one compound corresponding to the following general formula or to a tautomeric structure thereof:

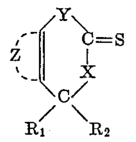

wherein:

Z represents the atoms necessary to close a fused-on phenyl nucleus including a substituted phenyl nucleus,
each of $R_1$ and $R_2$ represents hydrogen or lower alkyl including substituted lower alkyl, and
X and Y both represent —NH— or one of them represents —O— or —S— and the other one —NH—.

2. A photographic silver complex diffusion transfer process according to claim 1, wherein the compound defined is present in at least one water-permeable layer of the image-receiving material.

3. A photographic silver complex diffusion transfer process according to claim 1, wherein the compound defined is present in the processing bath.

4. A photographic silver complex diffusion transfer process according to claim 1, wherein the compound defined is present in at least one water-permeable layer of the light-sensitive material.

5. A photographic non-light-sensitive image-receiving material for use in a silver complex diffusion transfer process, comprising in the image-receiving layer or in a layer in water-permeable relationship with said image-receiving layer at least one compound corresponding to the following general formula or tautomeric structure thereof:

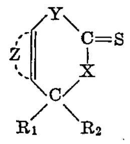

wherein:

Z represents the atoms necessary to close a fused-on phenyl nucleus including a substituted phenyl nucleus,
each of $R_1$ and $R_2$ represents hydrogen or lower alkyl including substituted lower alkyl, and
X and Y both represent —NH— or one of them represents —O— or —S— and the other one —NH—.

6. A processing bath for use in a silver complex diffusion transfer process and which contains at least one compound corresponding to the following general formula or tautomeric structure thereof:

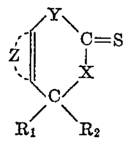

wherein:

Z represents the atoms necessary to close a fused-on phenyl nucleus including a substituted phenyl nucleus,
each of $R_1$ and $R_2$ represents hydrogen or lower alkyl including substituted lower alkyl, and
X and Y both represent —NH— or one of them represents —O— or —S— and the other one —NH—.

7. A photographic light-sensitive silver halide material for use in the silver complex diffusion transfer process comprising in the silver halide emulsion layer or in a layer in water-permeable relationship with the said emulsion layer at least one compound corresponding to the following general formula or tautomeric structure thereof:

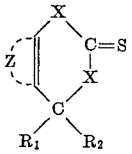

wherein:

Z represents the atoms necessary to close a fused-on phenyl nucleus including a substituted phenyl nucleus, each of $R_1$ and $R_2$ represents hydrogen or lower alkyl including substituted lower alkyl, and X and Y both represent —NH— or one of them represents —O— or —S— and the other one —NH—.

References Cited

UNITED STATES PATENTS

| | | | |
|---|---|---|---|
| 3,017,270 | 1/1962 | Tregillus | 96—76 |
| 3,160,505 | 12/1964 | Willems | 96—29 |
| 3,236,642 | 2/1966 | Rintelen | 96—29 |
| 3,360,368 | 12/1967 | Van Veelen | 96—29 |
| 3,432,108 | 3/1969 | Willems | 96—29 |

WILLIAM D. MARTIN, Primary Examiner

W. R. TRENOR, Assistant Examiner

U.S. Cl. X.R.

96—52, 76